United States Patent [19]

Lison et al.

[11] Patent Number: 4,720,036
[45] Date of Patent: Jan. 19, 1988

[54] METHOD AND APPARATUS FOR A SURFACE-IMPROVING TREATMENT OF BODY OF AN ALLOY HAVING A READILY OXIDIZABLE SURFACE-IMPAIRING COMPONENT

[75] Inventors: Rudolf Lison, Herzogenrath; Hans Dienstknecht, Langerwehe; Egon Sigismund, Aachen, all of Fed. Rep. of Germany

[73] Assignee: Kernforschungsanlage Julich Gesellschaft mit beschranker Haftung, Julich, Fed. Rep. of Germany

[21] Appl. No.: 924,135

[22] Filed: Oct. 27, 1986

Related U.S. Application Data

[63] Continuation of Ser. No. 720,525, Apr. 5, 1985, abandoned.

[30] Foreign Application Priority Data

Apr. 5, 1984 [DE] Fed. Rep. of Germany ....... 3412742

[51] Int. Cl.⁴ ............................................ B23K 1/20
[52] U.S. Cl. ...................................... 228/205; 228/208
[58] Field of Search ............... 228/205, 206, 207, 208; 11/11

[56] References Cited

U.S. PATENT DOCUMENTS

| | | | |
|---|---|---|---|
| 661,650 | 11/1900 | Thurston | 427/11 X |
| 2,667,431 | 1/1954 | Burnside | 427/11 |
| 2,914,425 | 11/1959 | McGuire | 427/11 |
| 3,606,672 | 9/1971 | Terai et al. | 228/205 X |

FOREIGN PATENT DOCUMENTS

| | | |
|---|---|---|
| 172747 | 6/1906 | Fed. Rep. of Germany . |
| 354670 | 6/1922 | Fed. Rep. of Germany . |
| 744952 | 1/1944 | Fed. Rep. of Germany . |
| 2308747 | 8/1974 | Fed. Rep. of Germany . |
| 1110339 | 4/1968 | United Kingdom . |

OTHER PUBLICATIONS

Dorn, *Hartloten-Grundlagen und Anwendungen*, Expert Verlage, Sindelfingen, W. Germany, 1985; pp. 90-91; 98-99.
Schoer et al, Development of a Process for Flux-Free Brazing of Aluminum in an Inert Gas Atmosphere.

*Primary Examiner*—Kenneth J. Ramsey
*Attorney, Agent, or Firm*—Frishauf, Holtz, Goodman & Woodward

[57] ABSTRACT

A rotary wire brush is used to transfer nickel, copper or brazing filler metal, like gold and silver from a slab of metal to the surface of a workpiece. The brush cleans the metal workpiece to expose a metal surface freshly and rubs metal of the metal slab for quick transfer for the freshly exposed metal surface of the workpiece where it sticks to build up a layer between one and one hundred microns thick in somewhere between one and two minutes. Metal slab and workpiece are both pressed against the brush, but the workpiece is not pressed enough to score the workpiece. The surface of the workpiece coated in this way can then be joined to another workpiece surface thus coated in a fluxless brazing or soldering process in which the temperature does not need to be higher than 1000° C.

2 Claims, 2 Drawing Figures

METHOD AND APPARATUS FOR A SURFACE-IMPROVING TREATMENT OF BODY OF AN ALLOY HAVING A READILY OXIDIZABLE SURFACE-IMPAIRING COMPONENT

This application is a continuation of application Ser. No. 720,525, filed Apr. 5, 1985, now abandoned.

This invention concerns a method of bonding metal surfaces or parts to be joined by fluxless furnace soldering or especially braxing and particularly with regard to a method and apparatus for precoating the surfaces to be bonded with a metal that facilitates or enables bonding. Such metals are broadly classed as solders or brazing filler metals, including particularly solders and brazing filler metals which are of copper base and are sometimes known as brazing metals or alloys and silver or gold brazing filler metals which contain silver or gold.

Certain 18/8 stainless steels, for example those containing titanium as an alloy additive, as well as various nickel-based alloys cannot be wetted with the assistance of furnace atmospheres without also using a flux. this holds particularly for soldering processes that must be carried out at temperatures below 1000° C. In order to make possible solder bonding of such workpiece materials, they are coated with surface layers which can be wetted without flux under brazing and soldering conditions as, for example, a nickel or copper layer. At the present time this is done particularly often by various nickel-plating processes performed either electrolytically or by so-called "electroless" processes. Such wet process precoating methods have their problems and require a certain skill and experience for successfull results.

For soldering aluminum it is already known to spread a solder on aluminum by a rolling process, as described in German Pat. No. 744,952. This technology, however, requires plane workpieces which become plastically deformed when the solder is rolled on.

SUMMARY OF THE INVENTION

It is an object of the present invention to provide precoating of the metallic surfaces to be bonded with a wettable or bond-promoting metal or solder in a dry process, in which the workpiece does not suffer any plastic deformation.

Briefly, the bond-promoting metal is mechanically applied to the surface by frictional engagement of a carrier thereof with the workpiece surface in relative lateral or tangential motion under pressure sufficient to cause particles to be removed from the carrier and mechanically spread on the surface of the workpiece.

Such a mechanical application of a bond-promoting precoat, whether or not of a known solder, is readily produced by abrasive transfer in which at the same time there is a mechanical exposure of fresh surfaces on the workpeice to be coated, as especially in the case of brushing on with a sufficiently rapidly moved brush.

In such a case the bursh can have bristles of the metal to be transferred which are worn off on the workpiece surface to be bonded, or else bristles of a wear-resistant material against which the metal to be transferred is pressed in the form of a compact body, thus coating the bristle tips.

The bristles should be sufficiently hard and wear-resistant and in particular, should have a greater hardness than the metal to be transferred, and yet be elastic enough to permit compensation for unevennesses of the workpiece surface. In consequence, finer and longer bristles are to be selected for workpieces exhibiting a surface structure, while thicker bristles are usable for smooth surfaces. Commercially available stainless steel brushes (average diameter 70-150 mm) with bristle thicknesses less than 1 mm have been successfully tested in the process of the invention.

The area density of the bristles likewise should be determined according to the surface structure and the hardness of the parts to be coated which should not receive any supplementary surface structure (such as grooves or the like) from the action of the brushes.

Preferably the transfer of the bond promoting metal on the workpiece to be coated is performed by means of a rotary disc brush or, especially, by a cylindrical brush. Both the workpiece to be coated and the coating metal are pressed against such a rotating brush, with the pressing force depending on the size of the surface to be coated, the nature of the surface of the material, and the geometry of the brush.

The brush used in the process of the invention should serve to remove so far as possible interfering or extraneous layers of the workpiece to be coated, as for example, oxide layers. On a surface thus cleared and freshly exposed, the metal particles of the solder coating should be spread as rapidly as possible, i.e. while the surface still remains metallically bare. If, therefore, the coating process takes place in air, the oxidation of the surface to be coated must be prevented or mitigated, which is usually obtainable by a sufficiently high speed of rotation of the brush and short spacing between the supply body of coating metal and the workpiece, in their respective locations in contact with the brush. When the time interval in which disturbing surface layers appear is too short, the operation must be carried on in inert gas e.g. argon.

For mechanical reasons the speed of a rotary brush cannot be raised as high as might be desired without the bristles coming off the brush by centrifugal force. The brush should, however, have at least enough speed so that the transfer time in air for the coating metal is at most 5 ms. With reduction of speed, moreover, the number of transferred metal particles is also reduced.

The metal to be transferred needs to have a relatively high ductility so as to make possible adhesion and distribution on the exposed workpiece surface. Common bond-promoting metals such as nickel, copper, gold, gold solder or 18/8 steels and nickel based alloys such as Au 18 Ni and all silver solders can be transferred without difficulty.

Coating a narrowly bounded region can be obtained by covering up the rest of the surface of the workpiece with a hard metal mask. The duration of the brushing on operation for a workpiece is to a great extent non-critical, because after sufficient transfer of the coating material on the workpiece no further increase in thickness of the coating metal layer takes place, since that layer itself is subjected to erosion by the brush. Normally obtained coating layers having thickness in the range from $10^{-3}$ to $10^{-1}$ mm and the minimum brush-on times range from about 1 to 2 minutes.

BRIEF DESCRIPTION OF THE DRAWING

The invention is further described by way of example with reference to the annexed drawing, in which.

DESCRIPTION OF THE ILLUSTRATED EMBODIMENT

Figure 1:
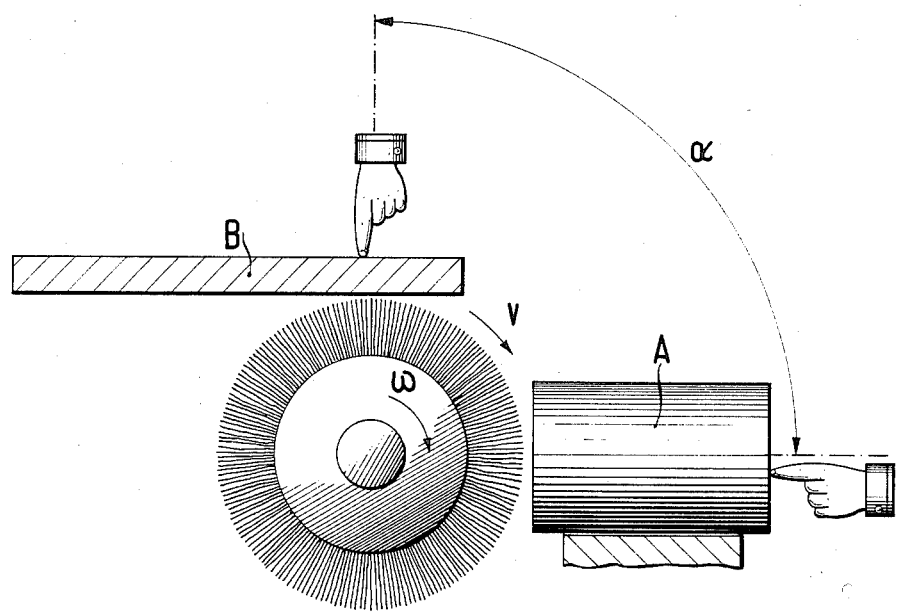
FIG. 1 is a schematic diagram of a rotary brush apparatus for coating a workpiece in accordance with the invention.

FIG. 1 shows a workpiece A which has a surface to be coated pressed against a stainless steel brush 1, which is rotated at an angular velocity ω. The surface of the workpiece A is cleaned in this way. At the same time, the material B to be applied to the workpiece A is pressed against the brush 1 at a location offset by the angle α. The time t (in seconds) between the exposure of the surface of A until particles carried by the brush reach the workpiece B as given by the quotient α/6n, with α being measured in degress and n in revolutions per minute. In the illustrated offset of workpiece A from metal mass B of 90°, it is possible to obtain, with rotary brush speeds of 3000 RPM up to 6000 RPM, intervals t from 5 milliseconds down to 2.5 milliseconds.

Figure 2:
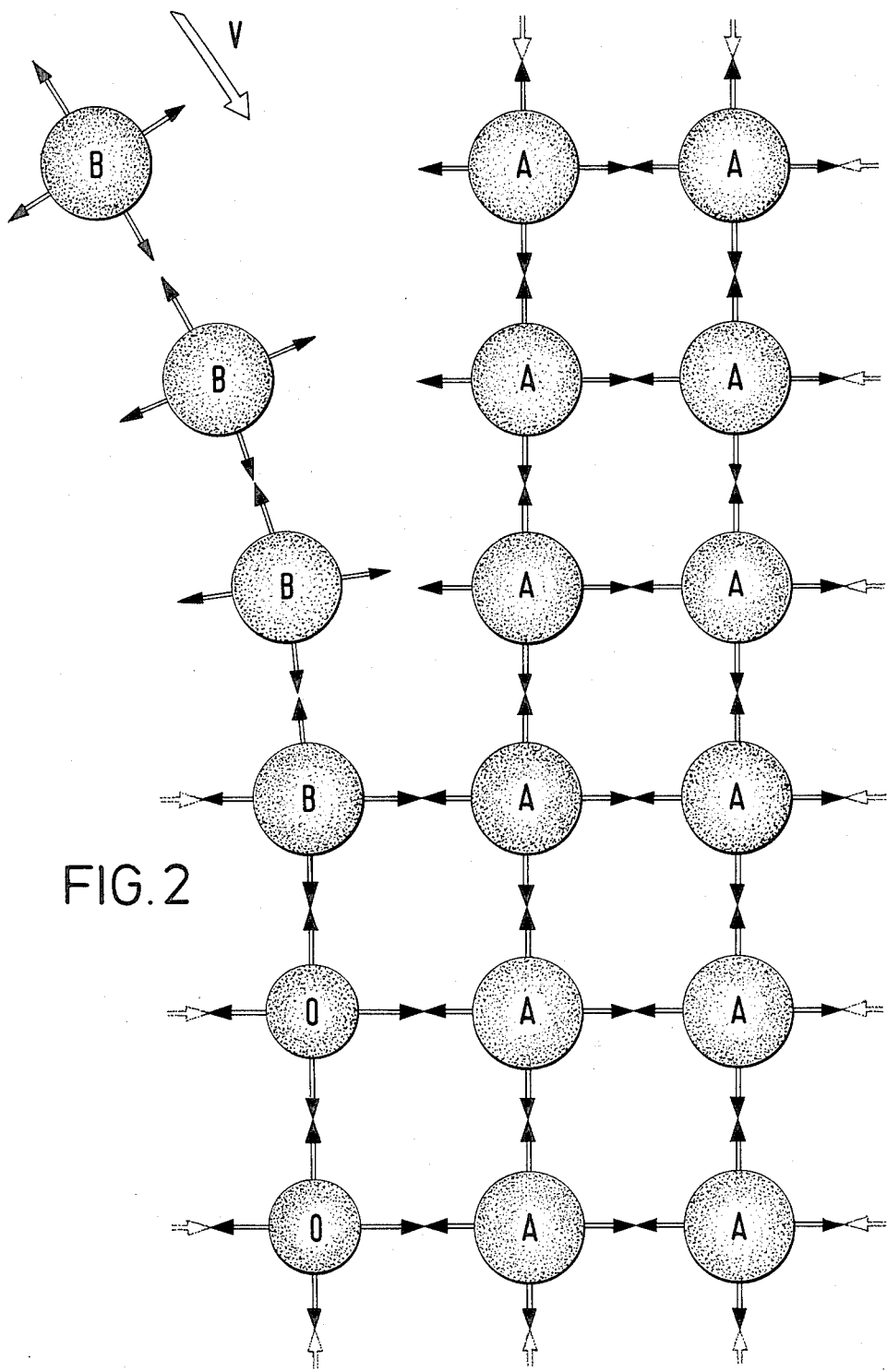
FIG. 2 is a diagram for explaining an aspect of the process of the invention.

FIG. 2 shows schematically the surface processes which take place in the practice of the method of the invention. The surface of the workpiece A originally saturated with oxide, nitride or the like, is freed from such surface layers by the attack of the brush, so that "unsaturated" atomic bonding forces of the atoms in the surface are present, which become saturated by the metallic particles of the coating material B which are transferred at a speed v by means of the rotating brush. The removal of the saturated surface layers likewise takes place in the material B from which the brush tears out particles of which the metallic bonding forces are unsaturated. The brush transports such particles to the workpiece A, where they tend to stick by virtue of the free bonds of the surface atoms. In this manner, thin layers of the metal B having good adhesion are produced on the workpiece, A resulting in good preparation of the surface to be wetted in a subsequent flux-free furnace soldering even though the workpieces themselves are of materials difficult to wet by molten metals.

With the process described above, all surfaces accessible with a brush, especially plane and cylindrical surfaces, can be prepared for a thermal joining process such as the welding of different materials together and especially for flux-free furnace soldering. The process seems similarly suited for the application of bonding or adhesion layers for thermal spraying processes or the like. The process of the invention is more economical than other coating methods presently in use.

As mentioned in the introduction, what has been referred to in many places as a bond-promoting metal is referred to hereinafter for brevity simply as a solder, that term being deemed, at least for purposes hereof, to be broad enough to comprehend all bond-promoting metals, whether pure or alloyed, which may be useful for the purposes of this invention.

Although the invention has been described with reference to a particular illustrative embodiment, it will be understood that modifications and variations are possible within the inventive concept.

We claim:

1. Process of bonding surfaces of bodies of an alloy metal including a readily oxidizable alloy component which impairs the surface bonding properties of said alloy, by fluxless brazing with a brazing filler metal, comprising the steps of:

pressing a body of bond-promoting metal and, simultaneously, a surface of a said alloy metal body to be bonded, against bristles of a rotating brush of a metal harder than said bond promoting metal, said brush rotating in a direction for scouring said bond promoting metal body, for picking up fine particles of said bond promoting metal on said bristles of said brush and simultaneously scouring or abrading said alloy metal body surface to eliminate any nonmetallic skin layer portions and transferring particles of said bond promoting metal in finely divided form onto said scoured substrate surface not more than five milliseconds after pick-up of said filler metal particles from said filler metal body, for at least one minute, until a layer of said bond promoting metal having a thickness in the range from $10^{-3}$ to $10^{-1}$ mm is formed on said alloy metal body surface to be bonded;

fitting together said coated surface of said alloy metal body with a surface of a metal to be bonded therewith by fluxless brazing in relative position in which said bodies are to be bonded together and with brazing filler metal in the fitting-together boundary and then heating them, while in contact with said brazing filler metal under fluxless brazing conditions, to a brazing temperature in a furnace, and cooling said bodies while said surfaces thereof are in contact with each other.

2. Process according to claim 1 in which said bristles of said rotary brush are of stainless steel.

* * * * *